July 12, 1927.
H. M. EAKIN
1,635,825
EMERGENCY BRAKE SETTING DEVICE
Filed Feb. 27, 1926   2 Sheets-Sheet 1
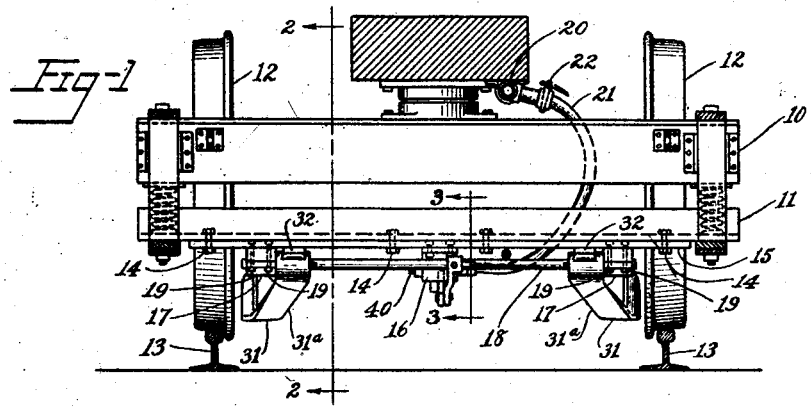
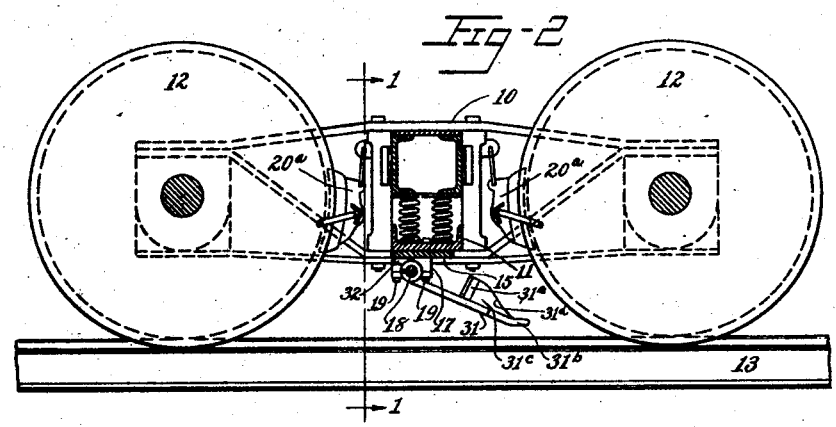
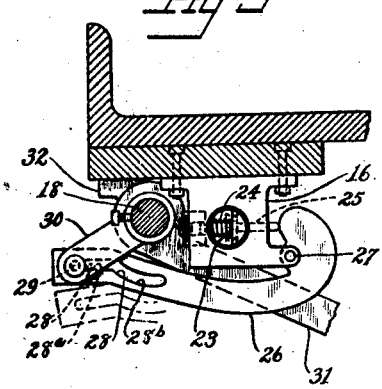
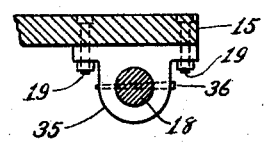
Inventor
Henry M. Eakin
By Willard D. Eakin
Atty.

July 12, 1927.
H. M. EAKIN
EMERGENCY BRAKE SETTING DEVICE
Filed Feb. 27, 1926
1,635,825
2 Sheets-Sheet 2
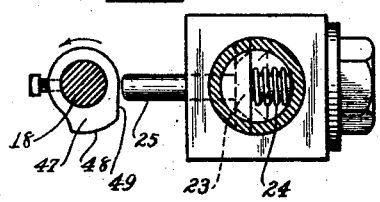
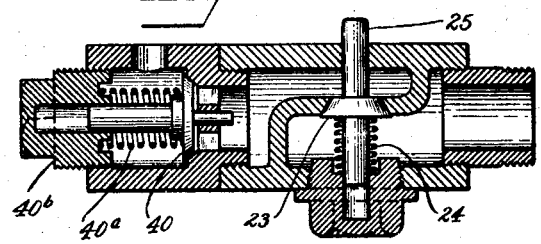
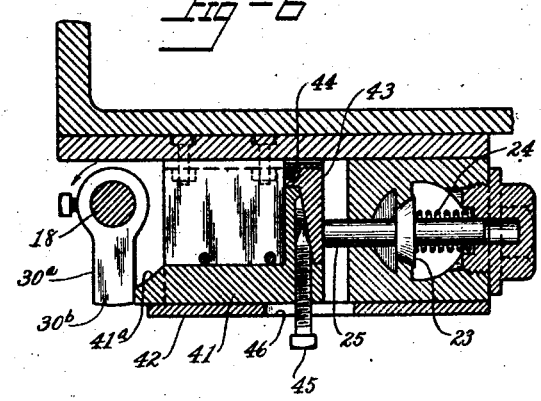
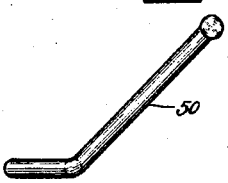
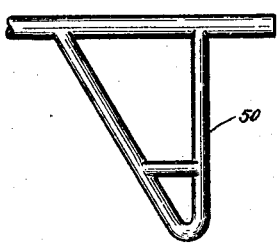
Inventor
Henry M. Eakin
By Willard D. Eakin
Atty Patented July 12, 1927.

1,635,825

UNITED STATES PATENT OFFICE.

HENRY M. EAKIN, OF SEATTLE, WASHINGTON.

EMERGENCY BRAKE-SETTING DEVICE.

Application filed February 27, 1926. Serial No. 91,241.

This invention relates to emergency brake-setting devices, and its chief object is to provide an improved device adapted automatically to set the brakes of a car such as a railway car, for example, promptly upon the descent of the body of the car toward the roadbed, as in the case of derailment of one or more wheels of a railway car, and thereby to prevent damage to the car and damage to the roadbed such as frequently occurs in consequence of the car continuing upon the roadbed after derailment, sometimes for a great distance, before the car is wrecked or otherwise effects a breaking of the air-line and application of the brakes.

Derailments are especially frequent on temporary and cheaply constructed railways such as are commonly built for logging purposes, both because of imperfections of the road and because of the débris which accumulates upon the track, and a further object of my invention is to provide a brake-setting device adapted to function efficiently and to function only upon derailment on roads more or less obstructed by such débris. More specifically, an object is to provide a brake-setting device having an actuating member adapted to withstand the jolting of the car and to throw aside obstructions without being actuated thereby and yet to be instantly effective in case of derailment. A further object is to provide a device adapted to open a relief valve only a determinate distance for the release of the air and yet to permit wide amplitude of movement of an actuating member, in contact with one of the rails, for example, so that the actuating member may accommodate itself to different positions of the car, during the continued movement of the latter, without damage.

Of the accompanying drawings:

Fig. 1 is a transverse section, on line 1—1 of Fig. 2, of parts of a railway car truck with my device in its preferred form mounted thereon, the said device being shown in rear elevation.

Fig. 2 is a section of the device on line 2—2 of Fig. 1, showing one of the actuating members in elevation as viewed from the middle of the track.

Fig. 3 is a section on line 3—3 of Fig. 1.

Fig. 4 is a section of a part of a modification of the device.

Fig. 5 is a horizontal section of the relief valve devices.

Fig. 6 is a vertical section of a portion of a modification.

Fig. 7 is a vertical section of parts of another modification.

Fig. 8 is a plan view of an alternative form of actuating member.

Fig. 9 is a side elevation of the same.

Referring first to Figs. 1 to 3 and 5 of the drawings, the car truck 10 is shown with the usual bolster 11 and wheels 12, 12, the latter being shown in normal running position upon the rails 13, 13. The usual air-brake devices, including the train-pipe 20 and brake-shoes $20^a$, $20^a$, are provided.

Secured to the lower face of the bolster 11 by bolts 14, 14 is a plate 15, to the lower face of which are bolted a valve-block 16 and a pair of two-part journal brackets 17, 17 near the respective sides of the car, the brackets being adapted frictionally to grip a shaft 18 mounted therein upon the tightening of the bolts 19, 19 by which the brackets are secured to the plate.

From the train-pipe 20 a hose 21 provided with a shut-off valve 22 runs to the valve-box 16, in which an escape valve 23 here shown as a tappet valve 23, is mounted and adapted when open to vent the train-pipe to the atmosphere through an adjustable relief valve 40 which is adapted to be set to open in response to a greater or less pressure, so as to prevent an excessively sudden and strong application of the brakes. The valve 23 may be backed by a spring 24 to assure its proper closing and is provided with a stem 25 slidably mounted in the valve-block 16 and projecting on the exterior thereof. The regulating valve 40 is backed by a spring $40^a$ (Fig. 5), seated upon a plug $40^b$ screwed into the valve casing, so that the force of back pressure upon the delivery side of the tappet valve 23 may be regulated.

For forcing the tappet valve open upon the turning of the shaft 18 counter-clockwise as viewed in Fig. 3 a cam lever 26 is pivoted at 27 between a pair of ears projecting from the valve-block 16, one arm of the lever, disposed vertically, being adapted to abut the stem 25 to open the valve 23 and the other arm being disposed horizontally and formed with a cam-slot 28 in which is mounted a stud 29 projecting laterally from an arm 30 secured upon the shaft 18. The cam-slot 28 comprises preferably a substantially straight valve-actuating portion 28ª and a valve-holding portion 28ᵇ so curved as to be concentric with the shaft 18 when occupied by the stud 29.

The lever 26 is preferably formed with a smoothly curved forward and lower edge, so as to depress and ride over, without catching upon, brush or the like lying between the rails.

For turning the shaft 18 and thereby opening the valve 23, in case of derailment, the said shaft has secured thereon, adjacent each of the brackets 17, a downwardly and forwardly extending plow-like actuating lever 31 terminating at its forward end preferably about two inches above and just inside of the adjacent rail 13, so that upon descent of the shaft 18 toward the roadbed, as in case of derailment, the forward end of one or the other of the levers 31 will be stopped in its descent by contact with the rail while sliding forward thereon and will thereby overcome the frictional grip of the shaft 18 by the brackets 17 and turn the shaft 18, counter-clockwise as viewed in Fig. 2 and in Fig. 3, and thus instantly release the air in the trainpipe 20 and so set the brakes.

Each of the levers 31 is formed with a lug 32 projecting rearwardly from its hub and adapted to contact the supporting plate 15 to prevent the lever 31 from being forced downward beyond its proper running position by débris encountered by the lever, while permitting the lever to be turned in the opposite direction in case of derailment.

The lever 31 is preferably of plow-like form or of such form as to effect a deflection of brush or the like toward the middle of the track, the lowermost point of the lever preferably being near its leading end so as to avoid the wedging of débris between the lever and the rail or the roadbed and consequent lifting of the lever. The lower face of the lever near its leading end is preferably given such angular relation to the rail or such rounded form as to slide forward in contact with the rail in case of derailment without gripping or biting into the rail.

In the embodiment shown in Figs. 1 and 2 each acuating lever comprises a wide shank portion 31ª to provide lateral strength for the deflection of débris, a forward portion having an upwardly-inwardly receding leading edge face 31ᵇ for deflecting débris with an upward component of force thereon, and a vertical fin 31ᶜ adjacent the rail, having an upwardly and rearwardly receding forward face 31ᵈ, to supplement the lifting effect of the face 31ᵇ and avoid the clogging of débris in the angle between the lever and the car-truck frame. The lever may also be conveniently constructed, of heavy, bendable sheet metal, with an oblique portion 31ᵉ bent laterally from the vertical fin 31ᶜ, to assist in deflecting the débris.

In the operation of the device, referring to the embodiment shown in Figs. 1 to 3, the two parts of each of the brackets 17 are tightened upon the shaft 18 with the actuating levers 31 in their lowermost positions, with the lugs 32 abutting the plate 15, and the shut-off valve 22 is opened to place the train-pipe 20 in communication with the interior of the valve-block 16. The arm 30 being in its uppermost position, the lever 26 is in position to permit the valve 23 to be held closed by the spring 24 and by the air pressure of the train-pipe. The device is thus put in condition for the operation of the car.

As the car is propelled over the rails 13 in normal operation the levers 31, by reason of their form as described, receive a downward component of force from substantially all obstructions encountered and remain in their lowermost positions while diverting obstructions and débris such as brush and the like toward the middle of the track, passing over only such obstructions as are not of such size as to be likely to cause derailment.

In case of derailment, the descent of the car truck toward the roadbed, accompanied necessarily by a lateral movement of the truck in one direction or the other, causes one or the other of the levers 31 to contact and to be stopped in its descent by the adjacent rail 13 while the further descent of the truck effects a relative movement of the lever toward the truck, thereby turning the shaft 18 and, through the arm 30 and lever 26, opening the valve 23 and permitting the air to escape from the train pipe through the adjustable relief valve 40, thereby causing the brakes to be applied and stopping the train, before any great damage has been done to the train or to the roadbed.

In the turning of the shaft 18 the first movement of the arm 30 opens the valve 23, while the stud 29 traverses the straight portion 28ª of the cam-slot 28, and the valve is then held open in a determinate position while the stud 29 runs in the arcuate portion 28ᵇ of the cam-slot to such position therein as may be determined by the descent of the truck with relation to the rail which contacts the one or the other of the levers 31, the friction grip of the brackets 17 upon the shaft 18 preventing a re-closing of the valve 23.

Meanwhile the lever 31, by reason of its angular relation to the rail, slides forward thereon without gripping or biting into it, while turning about the axis of and compelling the rotation of the shaft 18.

In the modification shown in Fig. 4 one of the two-part, shaft-gripping brackets 17 is substituted by a one-piece bracket 35 and a brake-pin 36 is mounted in the bracket and shaft, to serve instead of the lugs 32 of Figs. 1 and 2 to determine the running positions of the levers 31, the brake-pin being adapted to be sheared off by the relatively great force of a derailment.

In Fig. 6 is shown a cam slide 41 which may be employed instead of the cam lever 26 for opening the valve 23, the said slide being mounted in a guide-bracket 42 and adapted to be forced against the valve stem 25 by an arm 30ª secured on the shaft 18, the said arm being formed with a convexly curved end face 30ᵇ adapted to pass onto a complemental, concavely curved face 41ª formed on the slide, when the valve 23 has been opened a determinate distance, the faces 30ᵇ and 41ª being then concentric with the shaft 18 so that further turning of the shaft does not further open the valve.

The slide may be provided with an adjustable extension member 43 pivoted at 44 thereon and adapted to be adjusted by a tapered adjustment screw 45 screwed through the member 41 and having its head end projecting through a slot 46 in the bracket 42, for easy access for adjustment to determine the extent to which the valve 23 will be opened.

In Fig. 7 a simple cam 47 is secured upon the shaft 18 and adapted to act directly upon the valve stem 25 to open the valve 23, the cam being formed with a concentric cam face 48, following its valve-opening face 49, to hold the valve open a determinate distance while permitting further rotation of the shaft.

The valve actuating mechanism of Fig. 6 is preferred for use on cars employed in lumbering operations, because of the ground clearance afforded and the adjustability provided for by which instantaneous opening of the valve may be had, by elimination of lost motion.

In Figs. 8 and 9 is shown an actuating lever 50 of simple and inexpensive construction which may be substituted for the lever 31 of Figs. 1 and 2.

Various other modifications are possible within the scope of my invention as defined in the appended claims.

I claim:

1. A brake-setting device for a vehicle, the said device comprising a lever pivoted to a part of the vehicle and extending forwardly from its pivot to a position such that it will contact a part of the road in case of abnormal descent of the vehicle-body toward the roadway, means positively governing the lower-most position of the lever with relation to the vehicle, the said lever being so formed and associated as to be urged downwardly only by substantially all débris encountered in the forward movement of the vehicle, and means operatively connected to the lever for applying the brakes.

2. A brake-setting device for a vehicle, the said device comprising a member movably mounted on a part of the vehicle and adapted to contact a part of the road in case of abnormal descent of the vehicle-body toward the roadway, the said member having means thereon for laterally disposing of encountered obstructions in the manner of a plow, and means operatively connected to said member for applying the brakes upon contact of the member with the roadway.

3. A brake-setting device for a railway vehicle carrying a train-pipe, the said device comprising a valve adapted to release the air in the train-pipe, a contact member so mounted upon the vehicle as to be moved with relation thereto by contact with a part of the road upon derailment of the vehicle, and means interposed operatively between the said member and the said valve for opening the latter, the said means being so formed and associated as to open the valve only a determinate distance and so hold it while permitting a variable range of movement between the contact member and the vehicle.

4. A brake-setting device for a railway vehicle carrying a train-pipe, the said device comprising a transverse shaft rotatably mounted in the vehicle, a plow-like, forwardly projecting member secured to said shaft near each end thereof, in position for one or the other of said members to contact one of the rails in case of derailment, and means on said shaft for venting the train-pipe upon contact of one of the said members with one of the rails, each of the said plow-like members having means thereon for laterally diverting in the manner of a plow, débris encountered on the roadbed.

5. A brake-setting device for a railway vehicle carrying a train-pipe, the said device comprising an escape valve for the train-pipe, a member adapted to be actuated to open the escape valve by contact with one of the rails in case of derailment, and an adjustable relief valve adapted to control the drop of pressure in the train-pipe resulting from the opening of the escape valve.

6. A brake-setting device for a railway vehicle carrying a train-pipe, the said device comprising an escape valve for the train-pipe, a member adapted to be actuated to open the escape valve by contact with one of the rails in case of derailment, and adjustable means interposed between the said member and the said escape valve to provide against lost motion.

7. A brake-setting device for a railway vehicle carrying a train-pipe, the said device comprising a plate adapted to be secured to a part of the vehicle, a road-contacting member carried by said plate, means carried by said plate for venting the train-pipe, and means carried by said plate for operatively connecting said road-contacting member with said venting means, all of the parts defined being adapted to be mounted upon and removed from the vehicle as a unit.

8. A brake-setting device for a railway vehicle, the said device comprising brake setting means, a member mounted in position to be actuated by contact with one of the rails in case of derailment for actuating the said brake-setting means, and frictional means for retaining the said member in the position to which it is forced by contact with the rail.

In witness whereof I have hereunto set my hand this 18th day of February, 1926.

HENRY M. EAKIN.